United States Patent
Ring

[19]

[11] Patent Number: 5,943,809
[45] Date of Patent: Aug. 31, 1999

[54] FISHING POLE WITH LIGHT SOURCE

[76] Inventor: Ronald W. Ring, 8250 Hill Cir., Desoto, Kans. 66018

[21] Appl. No.: 09/095,524

[22] Filed: Jun. 10, 1998

[51] Int. Cl.[6] .................................................. A01K 87/00
[52] U.S. Cl. .................................. 43/17.5; 43/18.1; 43/25
[58] Field of Search .............................. 43/17, 17.5, 18.1, 43/25; 362/109

[56] References Cited

U.S. PATENT DOCUMENTS

| | | | |
|---|---|---|---|
| 1,021,745 | 3/1912 | Rolfe | 362/109 |
| 1,199,392 | 9/1916 | Lenzikow et al. | 43/17.5 |
| 1,247,346 | 11/1917 | Stern | 362/109 |
| 1,752,397 | 4/1930 | See | 43/17 |
| 1,900,965 | 3/1933 | Weiss | 43/17.5 |
| 2,012,894 | 8/1935 | Shoemaker | 43/18.1 |
| 2,283,430 | 5/1942 | Frettem | 43/17.5 |
| 2,530,050 | 11/1950 | Evans | 43/17 |
| 2,580,956 | 1/1952 | Reddick | 43/17 |
| 2,619,559 | 11/1952 | Schenkel | 362/109 |
| 2,741,054 | 4/1956 | Brundage | 43/17 |
| 2,791,676 | 5/1957 | Cote | 43/17.5 |
| 2,805,508 | 9/1957 | Oldfield | 43/17 |
| 2,816,387 | 12/1957 | Crowe et al. | 43/17 |
| 2,834,140 | 5/1958 | Knier | 43/17 |
| 2,863,251 | 12/1958 | Ackerman | 43/17 |
| 3,017,499 | 1/1962 | Fore | 43/17.5 |
| 3,238,659 | 3/1966 | Lamb, Jr. | 43/17 |
| 3,364,610 | 1/1968 | Poole | 43/17 |
| 3,571,536 | 3/1971 | Sparks | 43/17 |
| 3,600,836 | 8/1971 | Miyamae | 43/17 |
| 3,740,887 | 6/1973 | Van Leeuwen | 43/17.5 |
| 3,882,629 | 5/1975 | Kaye | 43/17 |
| 3,992,797 | 11/1976 | Kazakevich | 43/17 |
| 4,085,437 | 4/1978 | Hrdlicka et al. | 362/109 |
| 4,118,882 | 10/1978 | Gorsky | 43/17 |
| 4,178,712 | 12/1979 | Williams | 43/17 |
| 4,250,649 | 2/1981 | Harrington et al. | 43/17 |
| 4,376,349 | 3/1983 | Yarczower | 43/17 |
| 4,384,425 | 5/1983 | Lemons, Sr. | 43/17 |
| 4,399,631 | 8/1983 | Smith | 43/17 |
| 4,458,438 | 7/1984 | McCulley | 43/17 |
| 4,479,321 | 10/1984 | Welstead | 43/17 |
| 4,505,063 | 3/1985 | Price et al. | 43/17 |
| 4,621,447 | 11/1986 | Rhodes | 43/17.5 |
| 4,688,796 | 8/1987 | Wright | 362/109 |
| 4,750,287 | 6/1988 | Myers | 43/17.5 |
| 4,766,688 | 8/1988 | Hiles | 43/17 |
| 4,775,920 | 10/1988 | Seibert et al. | 362/109 |

(List continued on next page.)

FOREIGN PATENT DOCUMENTS

| | | | |
|---|---|---|---|
| 4-53437 | 2/1992 | Japan | 43/17.5 |
| 2196222 | 4/1988 | United Kingdom | 43/25 |

*Primary Examiner*—Michael J. Carone
*Assistant Examiner*—Darren W. Ark
*Attorney, Agent, or Firm*—Joseph N. Breaux

[57] ABSTRACT

A fishing pole with light source that includes an internally wired fishing rod assembly and a detachable, aimable light source. The fishing rod assembly includes a flexible elongated rod portion that is attached to a handle portion. The handle portion includes a battery connector positioned within a battery compartment formed therein. The rod portion has a pair of conducting wires running within the length thereof that are electrically connected at a first end with the battery connector of the handle portion and at a second end thereof to two electrical contact plates positioned at the tip end of the rod portion. The detachable, aimable light source includes a combination securing clip/electrical connector, a swivel assembly, and an aimable light assembly; the combination securing clip/electrical connector including a pair of opposed gripping jaws that define a gripping channel that is partially defined by two electrically separated securing clip electrical contact areas. The swivel assembly is in connection between the combination securing clip/electrical connector and the aimable light assembly. The aimable light assembly includes a light assembly housing, a light bulb, a rotatable focusing lens assembly, and two electrical wires forming an electrical connection between the two securing clip electrical contact areas and the light bulb.

12 Claims, 2 Drawing Sheets

U.S. PATENT DOCUMENTS

| | | | |
|---|---|---|---|
| 4,780,980 | 11/1988 | McCullough | 43/17.5 |
| 5,067,269 | 11/1991 | Eppley et al. | 43/17 |
| 5,159,774 | 11/1992 | Bennis et al. | 43/17.5 |
| 5,179,797 | 1/1993 | Edwards et al. | 43/17.5 |
| 5,205,061 | 4/1993 | Echols, Jr. | 43/17.5 |
| 5,228,228 | 7/1993 | Meissner | 43/17 |
| 5,274,943 | 1/1994 | Ratcliffe et al. | 43/17 |
| 5,555,667 | 9/1996 | Bae et al. | 43/17 |
| 5,566,493 | 10/1996 | Minorics | 43/17.5 |
| 5,586,403 | 12/1996 | Ward | 43/17.5 |
| 5,720,542 | 2/1998 | Birge, Jr. et al. | 362/109 |
| 5,797,211 | 8/1998 | Bae et al. | 43/17 |
| 5,855,084 | 1/1999 | Huddleston et al. | 43/17.5 |
| 5,868,487 | 2/1999 | Polley et al. | 362/109 |

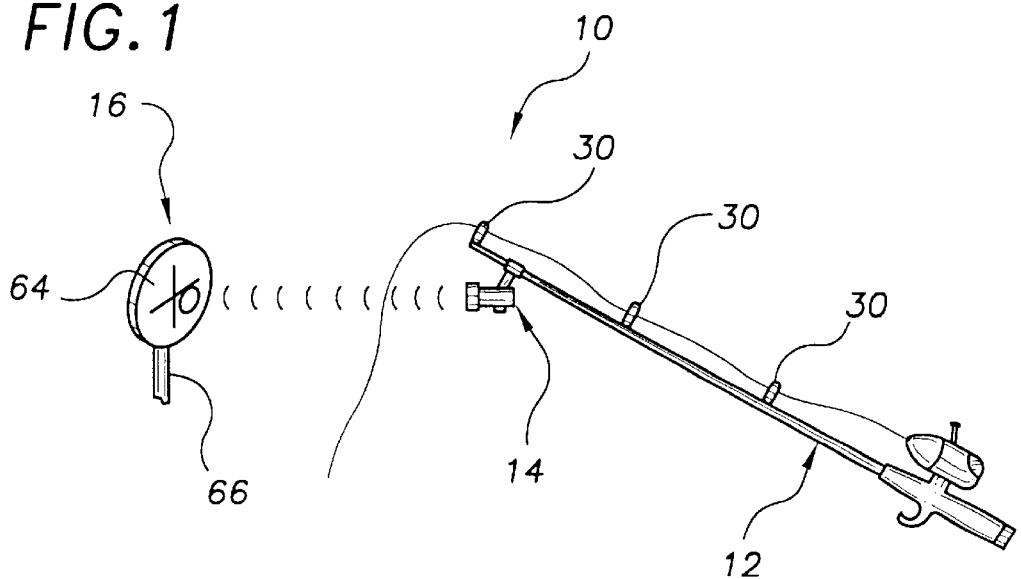
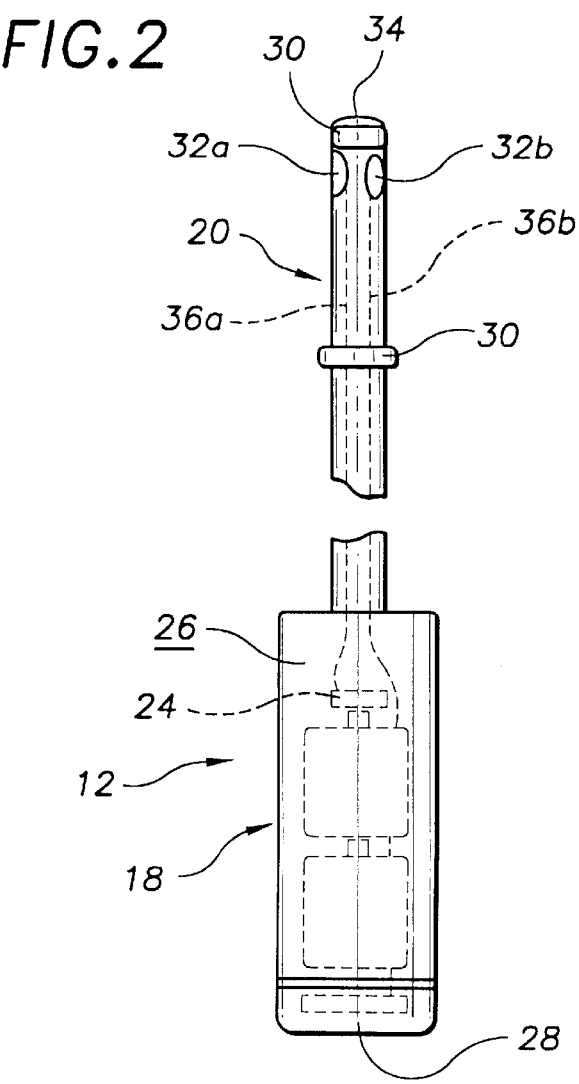

FISHING POLE WITH LIGHT SOURCE

TECHNICAL FIELD

The present invention relates to fishing equipment and more particularly to a fishing pole with a light source for aiding a fisherman in detecting movement of the tip end of the fishing rod; the fishing pole with light source including an internally wired fishing rod assembly and a detachable, aimable light source; the fishing rod assembly including a flexible elongated rod portion that is attached to a handle portion; the handle portion including a battery connector positioned within a battery compartment formed therein; the rod portion having a pair of conducting wires running within the length thereof that are electrically connected at a first end with the battery connector of the handle portion and at a second end thereof to two electrical contact plates positioned at the tip end of the rod portion; the detachable, aimable light source including a combination securing clip/electrical connector, a swivel assembly, and an aimable light assembly; the combination securing clip/electrical connector including a pair of opposed gripping jaws that define a gripping channel that is partially defined by two electrically separated securing clip electrical contact areas; the swivel assembly being in connection between the combination securing clip/electrical connector and the aimable light assembly; the aimable light assembly including a light assembly housing, a light bulb, a rotatable focusing lens assembly, and two electrical wires forming an electrical connection between the two securing clip electrical contact areas and the light bulb.

BACKGROUND ART

Many individuals enjoy fishing under dim or dark ambient light conditions. These conditions hamper viewing of movements of the tip end of the rod that can indicate a fish striking or tampering with the bait. It would be an advantage, therefore, to have a fishing pole that included a light source for illuminating the tip end of the fishing rod so as to help a fisherman notice small movements of the tip end while fishing under dim or dark ambient light conditions. Also, because it can be difficult and boring for a fisherman to constantly stare at the tip end of the fishing rod, it would be further desirable to have a fishing pole with a light source that could be aimed onto a target that allowed a fisherman to detect movent of the tip end of the fishing rod by movement of the light beam on the target. It would of course also be desirable to have a target included with the fishing pole when an aimable light source is included.

GENERAL SUMMARY DISCUSSION OF INVENTION

It is thus an object of the invention to provide a fishing pole with light source that is located at the tip end of the fishing rod.

It is a further object of the invention to provide a fishing pole with light source that includes an aimable light source that can be aimed at a target.

It is a still further object of the invention to provide a fishing pole with an aimable light source and a target including a focusing area member and a support stake.

It is a still further object of the invention to provide a fishing pole with light source that includes an internally wired fishing rod assembly and a detachable, aimable light source; the fishing rod assembly including a flexible elongated rod portion that is attached to a handle portion; the handle portion including a battery connector positioned within a battery compartment formed therein; the rod portion having a pair of conducting wires running within the length thereof that are electrically connected at a first end with the battery connector of the handle portion and at a second end thereof to two electrical contact plates positioned at the tip end of the rod portion; the detachable, aimable light source including a combination securing clip/electrical connector, a swivel assembly, and an aimable light assembly; the combination securing clip/electrical connector including a pair of opposed gripping jaws that define a gripping channel that is partially defined by two electrically separated securing clip electrical contact areas; the swivel assembly being in connection between the combination securing clip/electrical connector and the aimable light assembly; the aimable light assembly including a light assembly housing, a light bulb, a rotatable focusing lens assembly, and two electrical wires forming an electrical connection between the two securing clip electrical contact areas and the light bulb.

It is a still further object of the invention to provide a fishing pole with light source that accomplishes some or all of the above objects in combination.

Accordingly, a fishing pole with light source is provided. The fishing pole with light source includes an internally wired fishing rod assembly and a detachable, aimable light source; the fishing rod assembly including a flexible elongated rod portion that is attached to a handle portion; the handle portion including a battery connector positioned within a battery compartment formed therein; the rod portion having a pair of conducting wires running within the length thereof that are electrically connected at a first end with the battery connector of the handle portion and at a second end thereof to two electrical contact plates positioned at the tip end of the rod portion; the detachable, aimable light source including a combination securing clip/electrical connector, a swivel assembly, and an aimable light assembly; the combination securing clip/electrical connector including a pair of opposed gripping jaws that define a gripping channel that is partially defined by two electrically separated securing clip electrical contact areas; the swivel assembly being in connection between the combination securing clip/electrical connector and the aimable light assembly; the aimable light assembly including a light assembly housing, a light bulb, a rotatable focusing lens assembly, and two electrical wires forming an electrical connection between the two securing clip electrical contact areas and the light bulb. A target can be provided with the fishing pole if desired.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a perspective view of an exemplary embodiment of the fishing pole with light source of the present invention showing the internally wired fishing rod assembly with the battery compartment provided in the handle portion thereof; the detachable, aimable light source; and the optional user positionable target assembly including the flat focusing area member and the rigid support stake.

FIG. 2 is a detail plan view of the fishing rod assembly showing the battery connector positioned within the battery compartment formed within the handle portion of the fishing rod assembly, the two electrical contact plates positioned at the tip end of the rod portion of the fishing rod assembly, and the two wires running through the rod portion of the fishing rod and electrically connected between the battery connector positioned within the battery compartment and the two electrical contact plates provided at the tip end of the rod portion.

EXEMPLARY MODE FOR CARRYING OUT THE INVENTION

Figure 3:
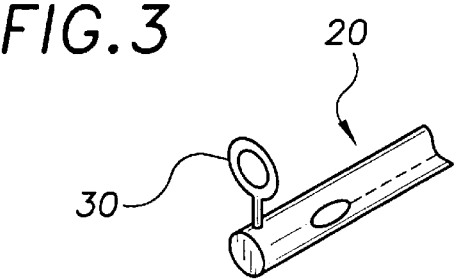
FIG. 3 is a detail perspective view of the tip end of the rod portion of the fishing rod assembly showing the line eyelet and one of the electrical contact plates.

FIG. 1 shows an exemplary embodiment of the fishing pole with light source of the present invention, generally designated 10. In this embodiment, fishing pole with light source 10 includes an internally wired fishing rod assembly, generally designated 12; a detachable, aimable light source, generally designated 14; and a user positionable target assembly, generally designated 16.

With reference now to FIG. 2, fishing rod assembly 12 includes a handle portion, generally designated 18, and a tubular rod portion, generally designated 20. Handle portion 18 has a conventional "C" sized two battery connector 24 positioned within a cylinder shaped battery compartment 26 formed therein that is accessible through a removable end cap 28. Tubular rod portion 20 is constructed of carbon fiber reinforced fiber glass and includes a number of convention line guides 30 spaced along the exterior thereof as in conventional fishing rod construction, two electrical contact plates 32a,32b positioned at the tip end 34 of rod portion 20, and two wires 36a,36b running through the interior passageway of tubular rod portion 20. Wires 36a,36b are electrically connected between the terminals of battery connector 24 and the two electrical contact plates 32a,32b.

Figure 4:
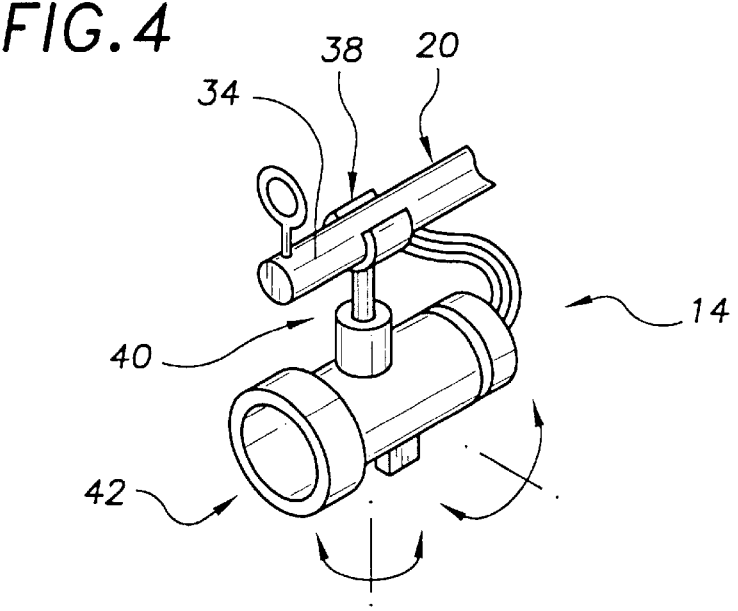
FIG. 4 is a detail perspective view showing the detachable aimable light source attached to the tip end of the rod portion showing the combination securing clip/electrical connector, the swivel assembly, and the aimable light assembly including the molded plastic light assembly housing, the on/off switch, the light bulb, the rotatable focusing lens assembly, and the electrical wires connecting the combination securing clip/electrical connector and the light bulb.

With reference to FIG. 3, during normal lighting conditions rod portion 20 can be used in the conventional manner. Referring to FIG. 4, under dim or dark light conditions, aimable light source 14 is attached to tip end 34 of rod portion 20. Aimable, light source 14 includes a combination securing clip/electrical connector, generally designated 38; a swivel assembly, generally designated 40; and an aimable light assembly, generally designated 42. Swivel assembly 40 is mounted between the combination securing clip/electrical connector 38 and aimable light assembly 42 to provide for easy aiming of aimable light assembly 42.

Figure 5:
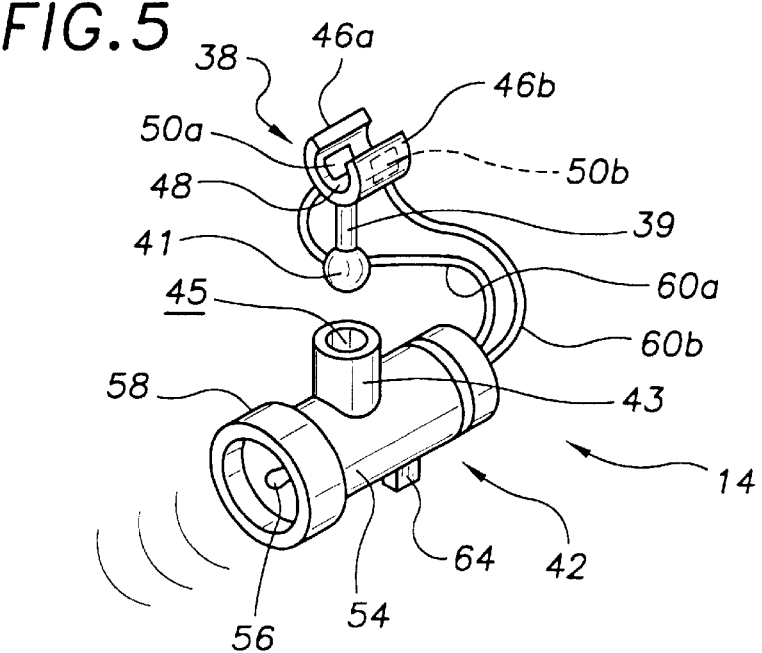
FIG. 5 is an exploded perspective view showing the detachable aimable light source in isolation with the ball end of the swivel rod of the swivel assembly removed from the ball swivelling cavity of the ball entrapment member of the swivel assembly; the two securing clip electrical contact areas within the gripping channel of the combination securing clip/electrical connector; and the aimable light assembly including the light assembly housing, the on/off switch, the light bulb, the rotatable focusing lens assembly, and the electrical wires connecting the two securing clip electrical contact areas of the combination securing clip/electrical connector and the light bulb.

Referring now to FIG. 5, combination securing clip/electrical connector 38 includes a pair of opposed gripping jaws 46a,46b that define a gripping channel 48 that is partially defined by two electrically separated securing clip electrical contact areas 50a,50b. Swivel assembly 40 includes a swivel rod 39 integrally formed with and extending from the underside of combination securing clip/electrical connector 38 that terminates in a ball end 41 and a ball entrapment member 43 integrally formed with aimable light assembly 42 and having a ball swivelling cavity 45 within which ball end 41 is moveably entrapped.

Aimable light assembly 42 is of molded plastic construction and includes a light assembly housing 54, a flashlight light bulb 56, a conventional rotatable, flashlight focusing lens assembly 58, and two electrical wires 60a,60b. Electrical wires 60a,60b form an electrical connection between securing clip electrical contact areas 50a,50b and light bulb 56. When combination securing clip/electrical connector 38 is secured onto rod tip end 34 (FIG. 4) an electrical connection is formed between electrically separated securing clip electrical contact areas 50a,50b and electrical contact plates 32a,32b (FIG. 2). In this embodiment, an on/off switch 64 is wired in series with light bulb 56 to allow the user to turn light bulb 56 on and off without detaching aimable, light source 14 from rod portion 20.

Referring back to FIG. 1, target assembly 16 includes a flat focusing area member 64 and a rigid plastic support stake 66.

It can be seen from the preceding description that a fishing pole with light source has been provided that includes a light source that is located at the tip end of the fishing rod; that includes an aimable light source that can be aimed at a target; that includes a target including a focusing area member and a support stake; and that includes an internally wired fishing rod assembly and a detachable, aimable light source; the fishing rod assembly including a flexible elongated rod portion that is attached to a handle portion; the handle portion including a battery connector positioned within a battery compartment formed therein; the rod portion having a pair of conducting wires running within the length thereof that are electrically connected at a first end with the battery connector of the handle portion and at a second end thereof to two electrical contact plates positioned at the tip end of the rod portion; the detachable, aimable light source including a combination securing clip/electrical connector, a swivel assembly, and an aimable light assembly; the combination securing clip/electrical connector including a pair of opposed gripping jaws that define a gripping channel that is partially defined by two electrically separated securing clip electrical contact areas; the swivel assembly being in connection between the combination securing clip/electrical connector and the aimable light assembly; the aimable light assembly including a light assembly housing, a light bulb, a rotatable focusing lens assembly, and two electrical wires forming an electrical connection between the two securing clip electrical contact areas and the light bulb.

It is noted that the embodiment of the fishing pole with light source described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fishing pole with light source comprising:

an internally wired fishing rod assembly, and a detachable, aimable light source;

said fishing rod assembly including a flexible elongated rod portion that is attached to a handle portion;

said handle portion including a battery connector positioned within a battery compartment formed therein;

said rod portion having a pair of conducting wires running within and along the length thereof that are electrically connected at a first end with said battery connector of said handle portion and at a second end thereof to two electrical contact plates positioned at a tip end of said rod portion;

said detachable, aimable light source including a combination securing clip/electrical connector, a swivel assembly, and an aimable light assembly;

said combination securing clip/electrical connector including a pair of opposed gripping jaws that define a gripping channel within which said tip end of said rod portion is gripped that is partially defined by two electrically separated securing clip electrical contact areas that are positionable in registration with said two electrical contact plates;

said swivel assembly being in connection between said combination securing clip/electrical connector and said aimable light assembly;

said aimable light assembly including a light assembly housing, a light bulb, a rotatable focusing lens assembly, and two electrical wires forming an electrical connection between said two securing clip electrical contact areas and said light bulb.

2. The fishing pole with light source of claim 1, further comprising:

a target assembly having a flat focusing area member and a rigid support stake extending from said focusing area member.

3. The fishing pole with light source of claim 2, wherein:

said aimable light assembly includes a switch wired in series with said light bulb.

4. The fishing pole with light source of claim 3 wherein:

said swivel assembly includes a swivel rod that terminates in a ball end; and a ball entrapment member having a ball swivelling cavity within which said ball end is moveably entrapped.

5. The fishing pole with light source of claim 4 wherein:

said swivel rod is integrally formed with and extends from said combination securing clip/electrical connector; and said ball entrapment member is integrally formed with said aimable light assembly.

6. The fishing pole with light source of claim 2 wherein:

said swivel assembly includes a swivel rod that terminates in a ball end; and a ball entrapment member having a ball swivelling cavity within which said ball end is moveably entrapped.

7. The fishing pole with light source of claim 6 wherein:

said swivel rod is integrally formed with and extends from said combination securing clip/electrical connector; and said ball entrapment member is integrally formed with said aimable light assembly.

8. The fishing pole with light source of claim 1, wherein:

said aimable light assembly includes a switch wired in series with said light bulb.

9. The fishing pole with light source of claim 8 wherein:

said swivel assembly includes a swivel rod that terminates in a ball end; and a ball entrapment member having a ball swivelling cavity within which said ball end is moveably entrapped.

10. The fishing pole with light source of claim 9 wherein:

said swivel rod is integrally formed with and extends from said combination securing clip/electrical connector; and said ball entrapment member is integrally formed with said aimable light assembly.

11. The fishing pole with light source of claim 1 wherein:

said swivel assembly includes a swivel rod that terminates in a ball end; and a ball entrapment member having a ball swivelling cavity within which said ball end is moveably entrapped.

12. The fishing pole with light source of claim 11 wherein:

said swivel rod is integrally formed with and extends from said combination securing clip/electrical connector; and said ball entrapment member is integrally formed with said aimable light assembly.

* * * * *